(12) United States Patent
Yun et al.

(10) Patent No.: US 7,686,410 B2
(45) Date of Patent: Mar. 30, 2010

(54) PRINTING ALIGNMENT LAYERS ON LCD SUBSTRATES WITH INK JET PRINTING APPARATUS

(75) Inventors: Yong Kuk Yun, Suwon-Si (KR); Baek Kyun Jeon, Yongin-Si (KR); Jin Soo Jung, Goyang-Si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 711 days.

(21) Appl. No.: 11/654,296

(22) Filed: Jan. 16, 2007

(65) Prior Publication Data

US 2007/0182768 A1 Aug. 9, 2007

(30) Foreign Application Priority Data

Jan. 16, 2006 (KR) .................. 10-2006-0004428

(51) Int. Cl.
*B41J 29/38* (2006.01)
*B41J 2/195* (2006.01)
*G02F 1/1333* (2006.01)

(52) U.S. Cl. .............................. 347/12; 347/7; 349/158

(58) Field of Classification Search .................. 347/12, 347/13, 15, 40–43, 50, 7; 349/158, 124
See application file for complete search history.

(56) References Cited

U.S. PATENT DOCUMENTS

| 2003/0117573 | A1* | 6/2003 | Yi et al. ...................... 349/158 |
| 2006/0181555 | A1* | 8/2006 | Usuda et al. ................... 347/7 |
| 2007/0091238 | A1* | 4/2007 | Shin ........................... 349/124 |

* cited by examiner

*Primary Examiner*—K. Feggins
(74) *Attorney, Agent, or Firm*—Innovation Counsel LLP

(57) ABSTRACT

An apparatus for printing a liquid crystal alignment layer of uniform thickness on a substrate of an LCD and a method for its use include an ink jet head that prevents the formation of stripes in the alignment layer as a result of variations in thickness of the alignment layer. The apparatus includes an alignment layer ink ejecting unit that includes an orifice unit having a plurality of orifices, and a plurality of control units, each including a piezoelectric element that controls the flow of ink through a corresponding one of the orifices. Each of the orifices includes a plurality of ink ejection passages through which the ink is ejected, and each of the passages terminates at nozzle, or ink ejection hole.

13 Claims, 7 Drawing Sheets

PRINTING ALIGNMENT LAYERS ON LCD SUBSTRATES WITH INK JET PRINTING APPARATUS

RELATED APPLICATIONS

This application claims priority of Korean Pat. App. No. 10-2006-0004428, filed Jan. 16, 2006, the entire disclosure of which is incorporated herein by reference.

BACKGROUND

The present invention relates to an ink jet printing apparatus for printing an alignment layer on a substrate of a liquid crystal display (LCD) and a method for printing an alignment layer using the novel apparatus. More particularly, the present invention relates to an LCD alignment layer printing apparatus having an ink jet head incorporating a structure for ensuring that the printed alignment layer has a uniform thickness.

A liquid crystal display (LCD) forms desired images by adjusting the amount of light transmitted through the panel in accordance with image signals applied to a number of control switches arrayed in a matrix on a substrate of the panel. The LCD comprises an LCD panel on which images are displayed by disposing a liquid crystal material between a color filter substrate and a thin film transistor (TFT) substrate, an LCD drive IC for operating the LCD panel, a back-light unit used as a light source of the LCD, and a chassis used to fasten respective components of the LCD into a single display unit.

During the fabrication of an LCD panel, an alignment layer, which is used to align the molecules of the liquid crystal material in a predetermined direction, is applied on an upper substrate, viz., the color filter substrate, and a lower substrate, viz., the TFT substrate, of the display. FIG. 1A is a schematic perspective view of an exemplary embodiment of a prior art LCD alignment layer printing apparatus, and FIG. 1B is a schematic perspective view of another exemplary embodiment of a prior art alignment layer printing apparatus.

The prior art alignment layer printing apparatus shown in FIG. 1A comprises an ink dispenser 141, a printing roller 142, a resin plate 143, an anilox roller 144, a doctor roller 145 and a stage 146. In this embodiment, an LCD substrate 147 is seated securely on the stage 146, and an alignment layer is printed on the substrate 147 using a flexography technique, i.e., a method in which a liquid alignment-layer-forming ink is applied on the resin plate 143 by the anilox roller, which contains a pattern of very fine dimples, or cells, corresponding to the pattern of the desired alignment layer to be formed, and then transferred from the resin plate onto the substrate 147. However, a drawback involved with using the foregoing flexography type of alignment layer printing apparatus is that it wastes a relatively large amount of the alignment layer ink during the process, thereby increasing LCD production costs.

The prior art alignment layer printing apparatus of FIG. 1B includes an ink jet head 150 for ejecting an alignment layer ink directly onto an LCD substrate 160. In this embodiment, the inkjet head 150 ejects the alignment layer ink directly onto the LCD substrate 160 through nozzles having orifices that eject the alignment layer ink onto the substrate in a pattern corresponding to the desired alignment layer 170.

FIG. 2 is an enlarged schematic perspective view of the prior art ink jet head 150 used in the prior art alignment layer printing apparatus of FIG. 1B, and FIGS. 3A and 3B are elevation views schematically illustrating a method for printing an alignment layer on an LCD substrate using the prior art ink jet head apparatus of FIG. 1B. Referring to FIG. 2, the ink jet head 150 includes a plurality of nozzles N1, N2, N3, N4, . . . , N2n−1 and N2n that are arranged in two parallel rows. The nozzles in the two rows are arranged such that the nozzles are spaced apart from one another by a selected interval, e.g., 750 microns (μm).

Referring to FIGS. 3A and 3B, in a first pass, or scanning session with the prior art apparatus, an alignment layer ink is ejected through the respective, spaced-apart nozzles of the ink jet head onto the substrate in the form of droplets, as illustrated in FIG. 3A, left, and the ink droplets are subsequently spread out and leveled with a wiping blade to form respective first alignment layer patterns, as illustrated in FIG. 3A, right. At this stage, since the spacing between the nozzles is relatively large, the alignment layer exhibits an undesirable variation in thickness, as illustrated in FIG. 3A, right. Then, in a second scanning session with the apparatus, the ink jet head is offset, or moved, relative to the substrate, such that the nozzles eject droplets of the alignment layer ink onto the substrate at positions intermediate of the positions at which the ink droplets were initially ejected during the first scanning session, as illustrated in FIG. 3B, left. These alignment layer droplets are also then spread out and leveled, as illustrated in FIG. 3B, right. However, as shown in FIG. 3B, right, even with this "two-session" ejection-and-leveling procedure, the alignment layer can still exhibit a variation in its thickness that results in the formation of undesirable longitudinal "stripes" in the alignment layer that can adversely affect the alignment of the liquid crystal molecules of the display, and hence, the quality of the images that it forms.

BRIEF SUMMARY

In accordance with the present invention, an ink jet printing apparatus for printing an alignment layer with a uniform thickness on an LCD substrate and a method of its use are provided that prevent stripes from being formed in the alignment layer as a result of variations in the thickness of the layer.

In one exemplary embodiment thereof, the LCD alignment layer printing apparatus comprises an alignment layer ink ejecting unit that includes an orifice unit with a plurality of orifices and a plurality of control units, each controlling the flow of the ink through a corresponding one of the orifices. Each of the orifices includes a plurality of ink ejection passages through which the ink is ejected, and each of the passages includes an ink nozzle, or ejection hole, disposed at a lower end thereof.

In an exemplary preferred embodiment, the ink ejecting unit further comprises an ink supply unit having a plurality of ink supply passages for supplying the ink to the orifices, and each of the control units includes a piezoelectric element and a plurality of variable resistors for adjusting a control voltage applied to the piezoelectric elements. The piezoelectric elements are preferably disposed on the alignment layer ink supply unit, and the alignment layer ink supply unit is disposed on the orifice unit.

The ink supply unit comprises a first ink supply member containing a passage into and out of which a plunger of the corresponding piezoelectric element moves when actuated, a second ink supply member having an ink supply passage with a predetermined size, and a third ink supply member having an ink supply passage with a predetermined size.

Each of the orifices further includes a main passage communicating with the ink supply passages, with the ink ejection passages branching off from the passages. In one exemplary embodiment, some of the ink ejection passages include a right angle bend at their distal ends, and in another alternative embodiment, some of the ink ejection passages are inclined at an angle with respect to a direction in which the alignment layer ink is ejected.

The plurality of ink ejection holes are preferably spaced apart from one another by a predetermined interval which is within a range of from between about 250 to about 375 µm. In a preferred exemplary embodiment, the plurality of orifices are arranged in a plurality of rows in such a manner that the orifices in a first row are staggered with respect to the orifices in a second of the rows.

According to another aspect of the invention, there is provided a method for printing an alignment layer with the apparatus, comprising the steps of preparing a substrate, ejecting an alignment layer ink onto the substrate using an alignment layer printing apparatus configured as described above, preliminarily drying the substrate on which the alignment layer ink is ejected, and baking the substrate.

Preferably, the alignment layer ink includes a solution containing polyimide.

A better understanding of the above and many other features and advantages of the printing apparatus and methods of the invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 4:
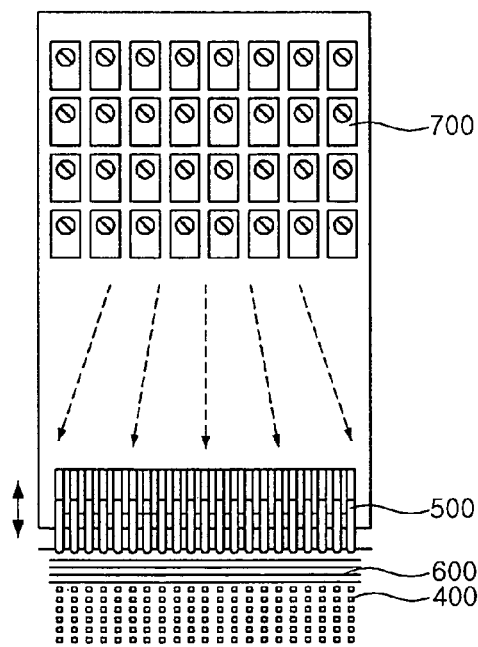
FIG. 4 is a schematic view of an ink jet head of an alignment layer printing apparatus in accordance with the present invention.

FIG. 4 is a partial schematic view of an ink jet head of an exemplary embodiment of an alignment layer printing apparatus in accordance with the present invention. As shown in FIG. 4, the ink jet head comprises an orifice unit 400, a plurality of piezoelectric elements 500, an alignment layer ink supply unit 600 and a plurality of potentiometers, or variable resistors 700. In the schematic view of FIG. 4, the variable resistors and the piezoelectric elements are shown in elevation view and mounted on and coupled to each other through a printed circuit board (PCB), whereas, the ink supply unit 600 and the orifice unit are disposed below the piezoelectric elements and shown in partial plan views rotated to lie in the plane of the PCB for illustration purposes.

As described in more detail below with reference to FIGS. 5A to 6C, the orifice unit 400A contains a plurality of orifices for ejecting an alignment layer ink directly onto an LCD substrate (not illustrated) disposed below the ink jet head. Each of the piezoelectric elements 500 functions to control a corresponding one of the plurality of orifices in the orifice unit 400, and accordingly, the number of piezoelectric elements 500 provided corresponds to the number of the orifices in the orifice unit 400. However, as described below, each of the orifices feeds, or opens to, a plurality of ejection holes, or nozzles, formed in the bottom surface of the orifice unit 400. Accordingly, each piezoelectric element 500 controls a plurality of the ejection holes, which are disposed in the orifice unit such that the interval, or spacing, between adjacent ejection holes is reduced, relative to the spacing between the piezoelectric elements. Additionally, the ejection holes are arranged in rows perpendicular to the direction in which the ink jet head moves during the printing process, described below.

Figure 5A:
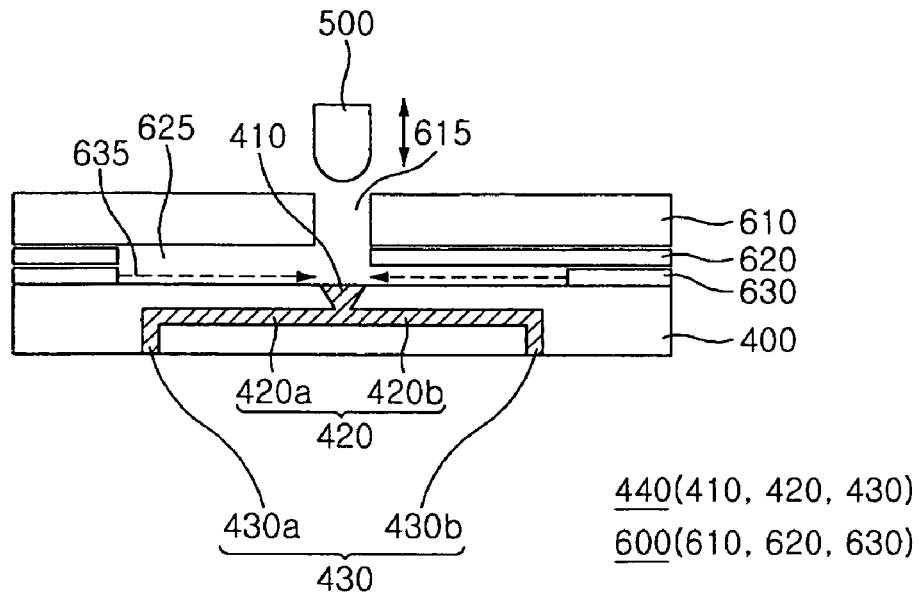
FIGS. 5A and 5B are schematic sectional and sequential plan views of the members of an ink jet head according a first embodiment of the present invention, respectively.

As illustrated in FIGS. 4 and 5A, the ink supply unit 600 is disposed between the piezoelectric elements 500 and the orifice unit 400, and contains a plurality of ink supply passages for supplying the liquid alignment layer ink to the orifices of the orifice unit during printing.

Each of the piezoelectric elements 500 includes a plunger element that is arranged to move down and up in the direction of the arrow in FIG. 4 when an electric field of a selected value is applied to the element. That is, the piezoelectric elements 500 convert electric energy into a mechanical displacement of the plunger element, as described below. The piezoelectric elements 500 are disposed above the ink supply passages of the ink supply unit 600, and the alignment layer ink is supplied through the ink supply passages to the respective openings of the orifices. Thus, when a predetermined voltage is applied to a piezoelectric element 500, the plunger of the piezoelectric element 500 functions like a pump that pushes the ink in the corresponding passages of the supply unit down into a corresponding one of the orifices. As a result, a selected amount of the alignment layer ink collected in the corresponding supply passages and orifice is injected into the plurality of nozzles or ejection holes associated with that orifice and then ejected from the ejection holes of the orifice unit 400 onto the surface of an LCD substrate.

Each of the variable resistors 700 functions to adjust the voltage applied to the corresponding piezoelectric element 500. Thus, adjustment of the resistance of the variable resistor 700 adjusts the stroke of the plunger of the corresponding piezoelectric element, and hence, the amount of ink that is injected into the corresponding orifice and then ejected out of the corresponding plurality of ejection holes associated therewith.

Figure 5B:
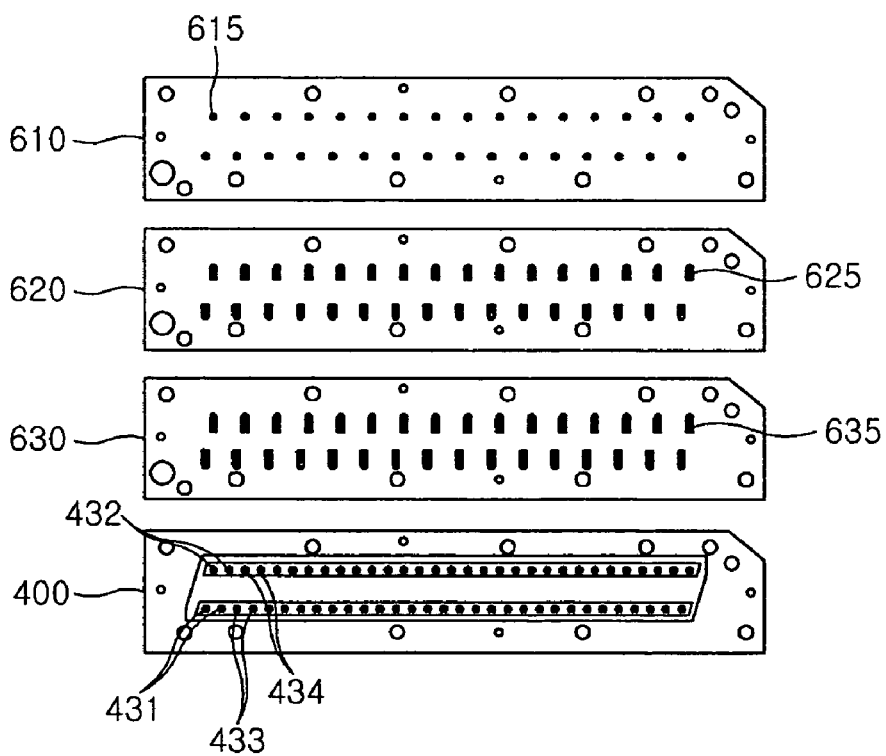
Figure 5C:
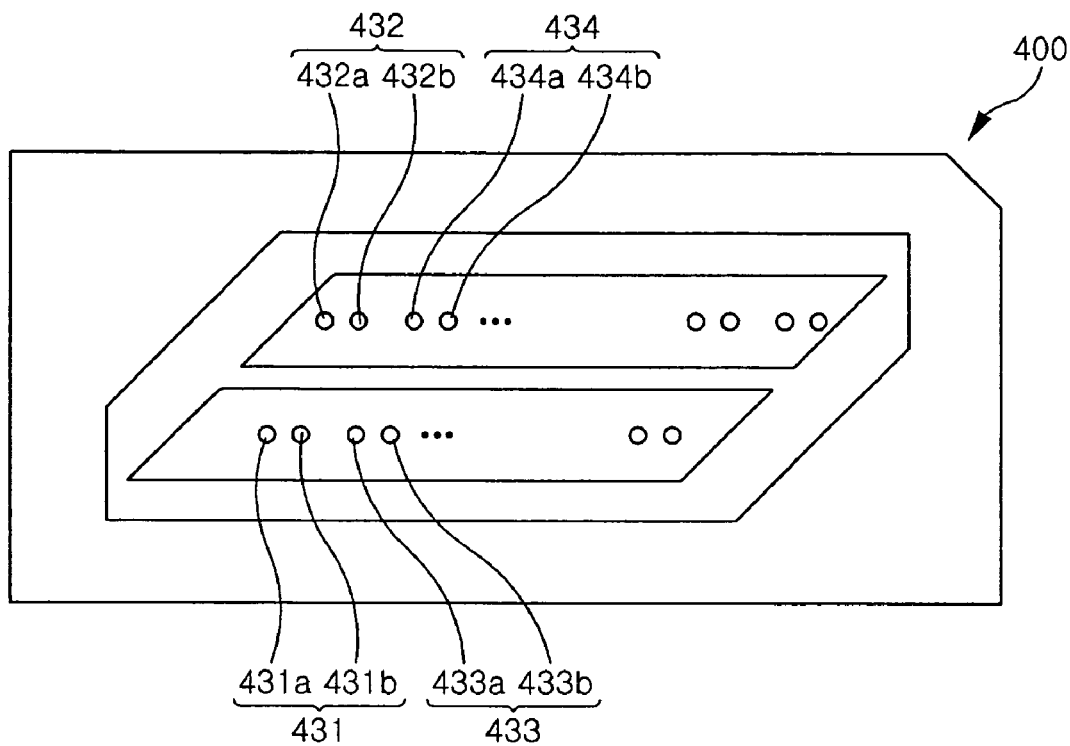
FIG. 5C is an enlarged perspective plan view of an orifice unit of the ink jet head.

FIGS. 5A and 5B are a partial schematic sectional and sequence of plan views of the ink jet head according a first exemplary embodiment of the present invention, respectively, and FIG. 5C is an enlarged perspective plan view of the orifice unit 400. With reference to FIG. 5A, a plurality of orifices are formed in the orifice unit 400. For convenience of illustration, only a single exemplary orifice 440 corresponding to one of the piezoelectric elements 500 is shown in FIG. 5A. The exemplary orifice 440 includes a main opening or passage 410, a plurality of alignment layer ink ejection passages 420 that branch off from the main passage 410, and a plurality of alignment layer ink nozzles, or ejection holes 430, formed at the respective ends of the ink ejection passages 420. In the particular exemplary embodiment illustrated in FIG. 5A, the orifice 440 includes two oppositely directed ink ejection passages 420a and 420b, and two respectively corresponding ink ejection holes or nozzles 430a and 430b. Each of the two ink ejection passages includes a right angle bend at its distal end.

As illustrated in FIGS. 5A and 5B, the ink supply unit 600 containing the ink supply passages is disposed above the orifice unit 400 and below the piezoelectric elements 500. Referring to the figures, the ink supply unit 600 comprises first, second and third ink supply plates, or members 610, 620 and 630, respectively. The first ink supply member 610 contains apertures 615, each of which has a size and shape corresponding to those of the plunger of the corresponding piezoelectric element 500, and into which the plunger moves when actuated, as indicated by the arrow in FIG. 5A.

As shown in the partial cross-sectional view FIG. 5A and in the serial plan views of 5B, the second ink supply member 620 is disposed below the first ink supply member 610, and includes ink supply passages 625, each having a selected size. The third ink supply member 630 is disposed below the second ink supply member 620 and includes ink supply passages 635, each having a selected size. In the exemplary embodiment of FIG. 5A, the alignment layer ink is supplied to the main passage 410 of the orifice 440 via the ink supply passages 625 and 635 in the second and third ink supply members 620 and 630, and thence, to the ink ejection passages 420 branching off from the main passage of the orifice.

Operation of the exemplary ink jet head described above is as follows. An alignment layer ink is supplied to the main passage 410 of the orifice 440 and the two ink ejection passages 420a and 420b branching off from it through the respective ink supply passages 625 and 635 of the second and third ink supply members 620 and 630. A selected voltage is applied to the piezoelectric element 500, causing the plunger of the piezoelectric element 500 to extend or retract in the direction indicated by the arrow in FIG. 5A. An extension, or downward movement, of the plunger of the piezoelectric element 500 causes the alignment layer ink to be pumped, or ejected, out of the two ink ejection holes 430a and 430b of the orifice 440 to the outside of the ink jet head. Conversely, retracting the plunger of the piezoelectric element 500, i.e., moving it back up to its original position, allows ink disposed above the first ink supply member 610 to flow down into the two ink supply passages 625 and 635, and thence, to the main passage of the orifice, thereby replenishing the ink previously ejected from the nozzle with an equal amount of ink.

Referring to FIGS. 5B and 5C, the first, second and third alignment layer ink supply members 610, 620 and 630, and the orifice unit 400 are shown in respective serial plan views of FIG. 5B, and the orifice unit 400 is shown in the perspective plan view of FIG. 5C. As shown in these figures, the orifice unit 400 includes the plurality of orifices 440 described above, which are divided into two rows and arranged as first and second groups of orifices 431, 433, . . . 43i, and 432, 434, . . . 43j, where i is odd and j is even. The first group of odd-numbered orifices 43i is disposed in a row at a front portion of the orifice unit 400, and the second group of even-numbered orifices 43j is disposed at a rear portion of the orifice unit 400.

Additionally, as described above, each of the orifices 440 feeds two of the alignment layer ink nozzles, or ejection holes. Thus, the odd-numbered ink ejection holes 431a, 431b, 433a, 433b, . . . are arranged in the first or front group of orifices, and the even-numbered alignment layer ink ejection holes 432a, 432b, 434a, 434b, . . . are arranged in the second or rear group of orifices. Further, the respective orifices of the first and second groups of orifices are disposed in a laterally offset, or staggered arrangement with respect to each other, as shown in the bottom plan view of FIG. 5B.

In addition to the above staggered arrangement, in the particular embodiment illustrated, the respective ejection holes of each orifice are spaced apart from one another laterally at a selected pitch, or interval, e.g., 375 μm or less. The diameter of each ejection hole is about 70 μm, and the first and second rows or groups of orifices are spaced apart from each other by about 6 to 7 mm. However, it should be understood that the present invention is not limited to the foregoing ink ejection hole spacings and sizes, but can be varied, depending on the circumstances. For example, if the structure of the orifices is modified as described below, the spacing between the adjacent ejection holes can be reduced to about half the spacing (about 750 μm) between adjacent ejection holes of the prior art ink jet head described above, so that the alignment layer ink is applied to an underlying LCD substrate with a more uniform thickness.

Figure 6A:
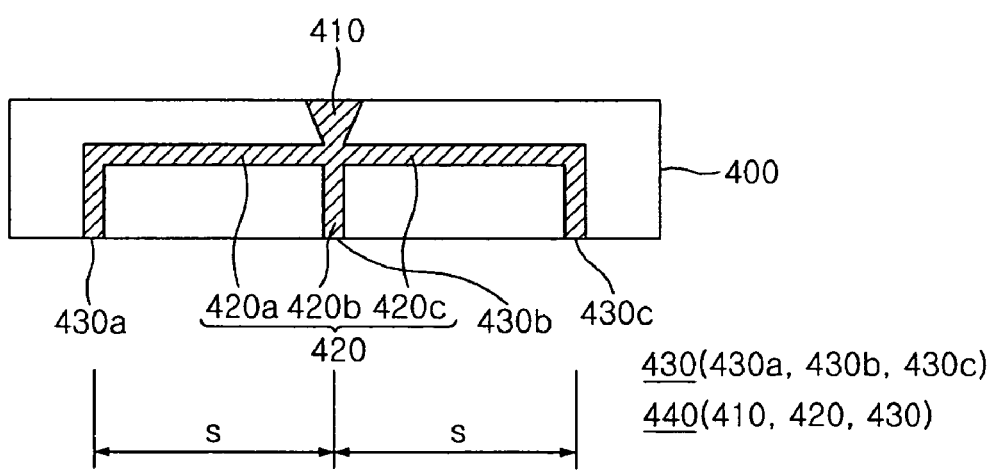
FIGS. 6A to 6C are schematic sectional views of orifice units of an ink jet head according to second to fourth exemplary embodiments of the present invention, respectively.
Figure 6B:
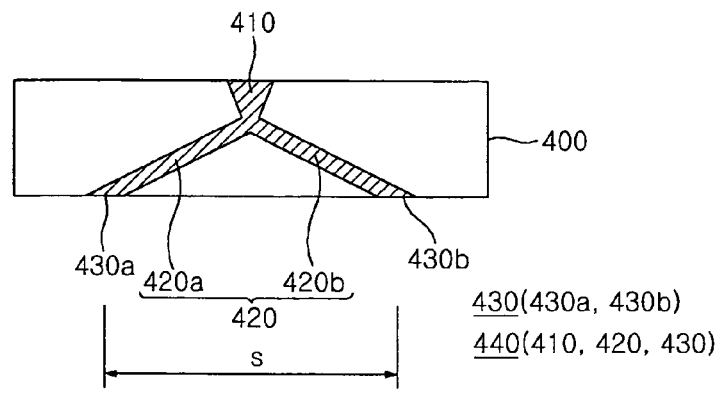
Figure 6C:
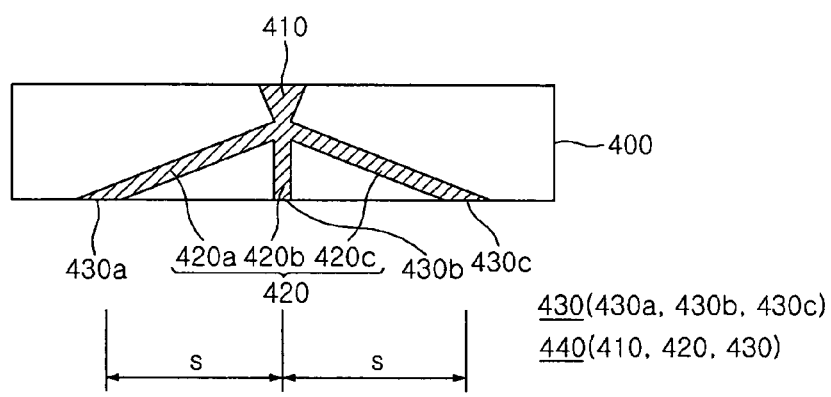

FIGS. 6A to 6C are schematic cross-sectional views of the orifice units of second to fourth exemplary embodiments, respectively, of an ink jet head in accordance with the present invention. For convenience of illustration, only one of the orifices 440 of the respective three orifice units 400 is illustrated in FIGS. 6A to 6C.

Referring to FIG. 6A, each orifice 440 of the orifice unit 400 of the second exemplary ink jet head embodiment includes a main passage 410, three alignment layer ink ejection passages 420, two of which branch off in opposite directions from the main passage 410, and three ink ejection holes 430 respectively disposed at the ends of the passages 420. In the second exemplary embodiment, the number of the ink ejection passages and holes 420 and 430 are thus different from those of the first embodiment described above, but the other features and components are otherwise identical to those of the first embodiment.

Referring to FIG. 6A, a second, or central ink ejection passage 420b is formed to extend directly downward from the main passage 410, whereas, first and third ink ejection passages 420a and 420c are formed to extend away from it laterally and in opposite directions and incorporate right-angle bends that are respectively spaced apart from the second ejection passage 420b by a selected distance, e.g., about 250 μm. The ink ejection holes 430a, 430b and 430c are formed at the ends of the first to third ink ejection passages 420a, 420b and 420c, respectively. As will be appreciated, in this embodiment, the spacing s between the adjacent ink ejection holes is about 250 μm, which represents a substantial reduction in the spacing between the holes of about one third, as compared with the spacing between the ejection holes of the prior art ink jet head described above.

Referring to FIG. 6B, an orifice 440 of an ink jet head according to the exemplary third embodiment includes a main passage 410, two alignment layer ink ejection passages 420 branching downward and laterally from the main passage 410, and two ink ejection holes 430 respectively formed at the ends of the two passages 420. In the third embodiment, the shape of the ink ejection passages 420 is different from that of the first embodiment, but the other features and components are generally identical to those of the first embodiment. In particular, the first and the second ink ejection passages 420a and 420b branch off from the main passage 410 inclined at a selected angle relative to the direction in which the ink is ejected.

FIG. 6C illustrates an orifice 440 of a fourth exemplary embodiment of inkjet head, which includes a main passage 410, three alignment layer ink ejection passages 420 branching off from the main passage 410, and three ink ejection holes 430 formed at respective ends of the three passages 420. In the fourth exemplary embodiment illustrated, the number of ink ejection passages and holes 420 and 430 is different from those of the third embodiment above, but otherwise, its features and components are generally identical to those of the third embodiment.

It should be understood that, in addition to those of the exemplary embodiments described above, the number of ejection holes for each ejection passage can be adjusted such that the interval s between the adjacent ejection holes is further reduced.

Figure 1A:
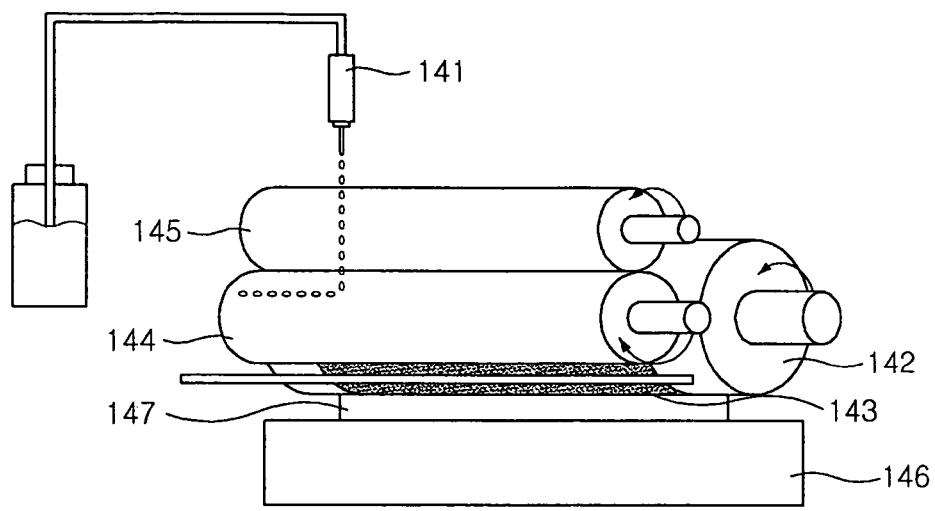
FIG. 1A is a schematic perspective view of a prior art alignment layer printing apparatus implementing a flexography printing method.
Figure 1B:
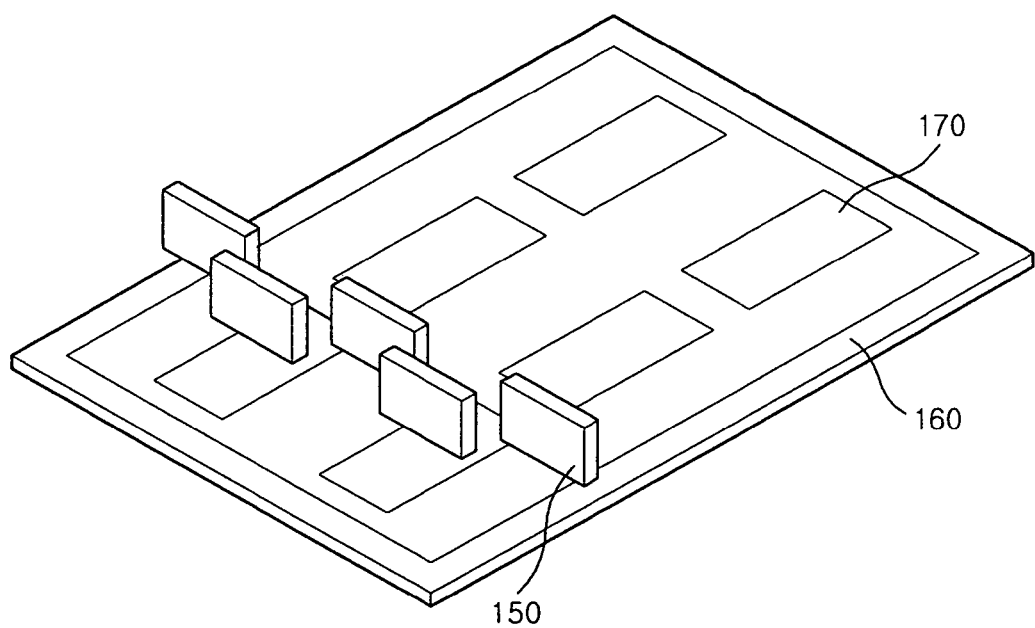
FIG. 1B is a schematic perspective view of another alignment layer printing apparatus implementing an ink jet printing method.
Figure 2:
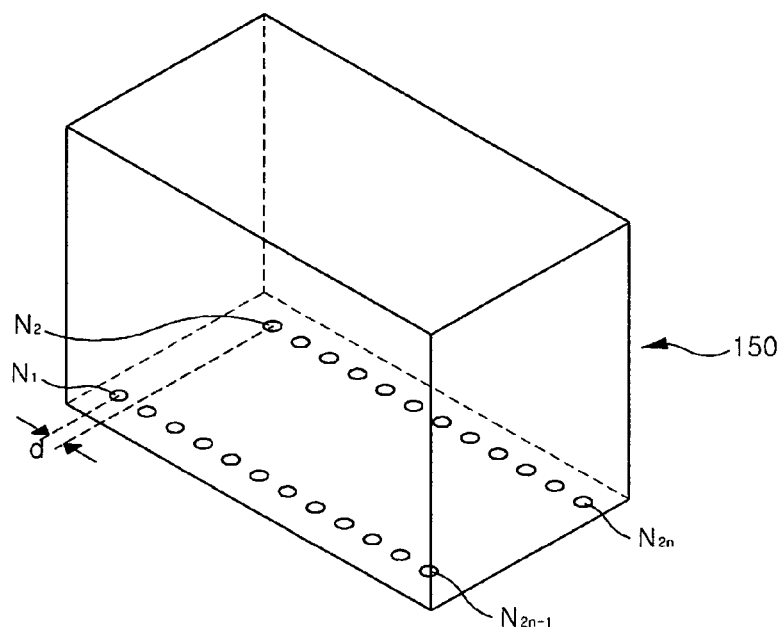
FIG. 2 is a schematic perspective view an ink jet head used in the prior art printing apparatus of FIG. 1B.
Figure 3A:
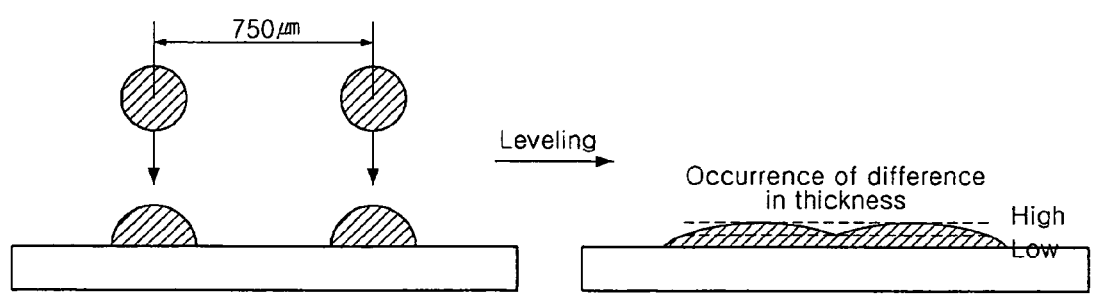
FIGS. 3A and 3B are schematic side elevation views illustrating a method for printing an alignment layer on an LCD substrate using the prior art ink jet head of FIG. 2.
Figure 3B:
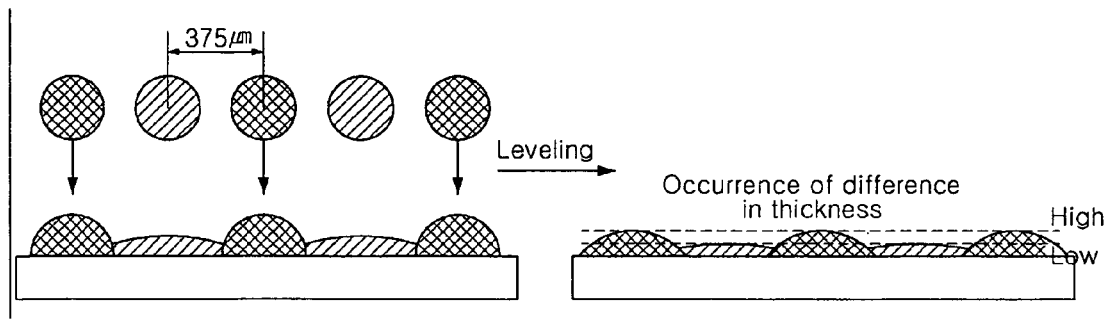
Figure 7:
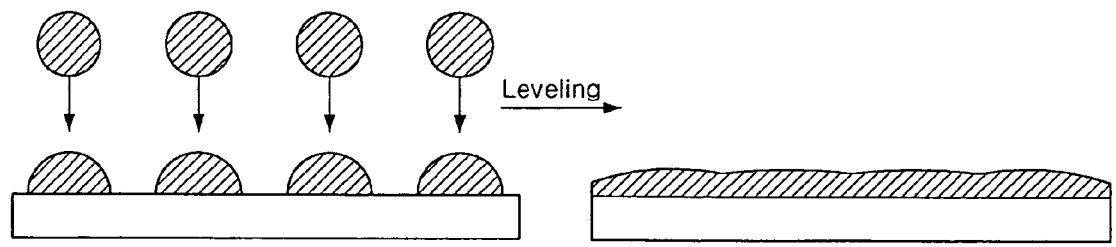
FIG. 7 is a view schematically illustrating a method for printing an alignment layer using the exemplary ink jet head embodiments according to the present invention; and, FIG. 8 is a flowchart of a method for printing an alignment layer using the alignment layer printing apparatus having an ink jet head in accordance with the present invention.

FIG. 7 is a view schematically illustrating an exemplary method for printing an alignment layer on an LCD substrate with an ink jet head in accordance with the present invention. As illustrated in FIG. 7, left, the alignment layer ink is first ejected through the two or three alignment layer ink ejection passages and holes of the orifice of an ink jet head in accordance with any of the exemplary embodiments described above, and onto an underlying LCD substrate in the form of droplets. As may be seen by a comparison of FIG. 7, left, with FIG. 3A, left, the spacing between the adjacent alignment layer ink droplets on the substrate is substantially decreased, as compared with the prior art droplet spacing.

After the ink is ejected onto the substrate, the ink droplets are then spread and leveled, e.g., with the edge of a wiper blade (not illustrated), to coalesce the droplets into the alignment layer illustrated in FIG. 7, right. As may be seen by a comparison of FIG. 7, right, with FIG. 3A, right, since the spacing between the adjacent alignment layer ink ejection holes is small, there is almost no variation in the thickness of the alignment layer formed. Therefore, the apparatus of the method enables the alignment layer to be applied with a uniform thickness. Additionally, the alignment layer can be uniformly applied in only a single pass, or scanning session, and stripes are thus prevented from being formed in the alignment layer due to variations in the thickness of the layer.

Figure 8:
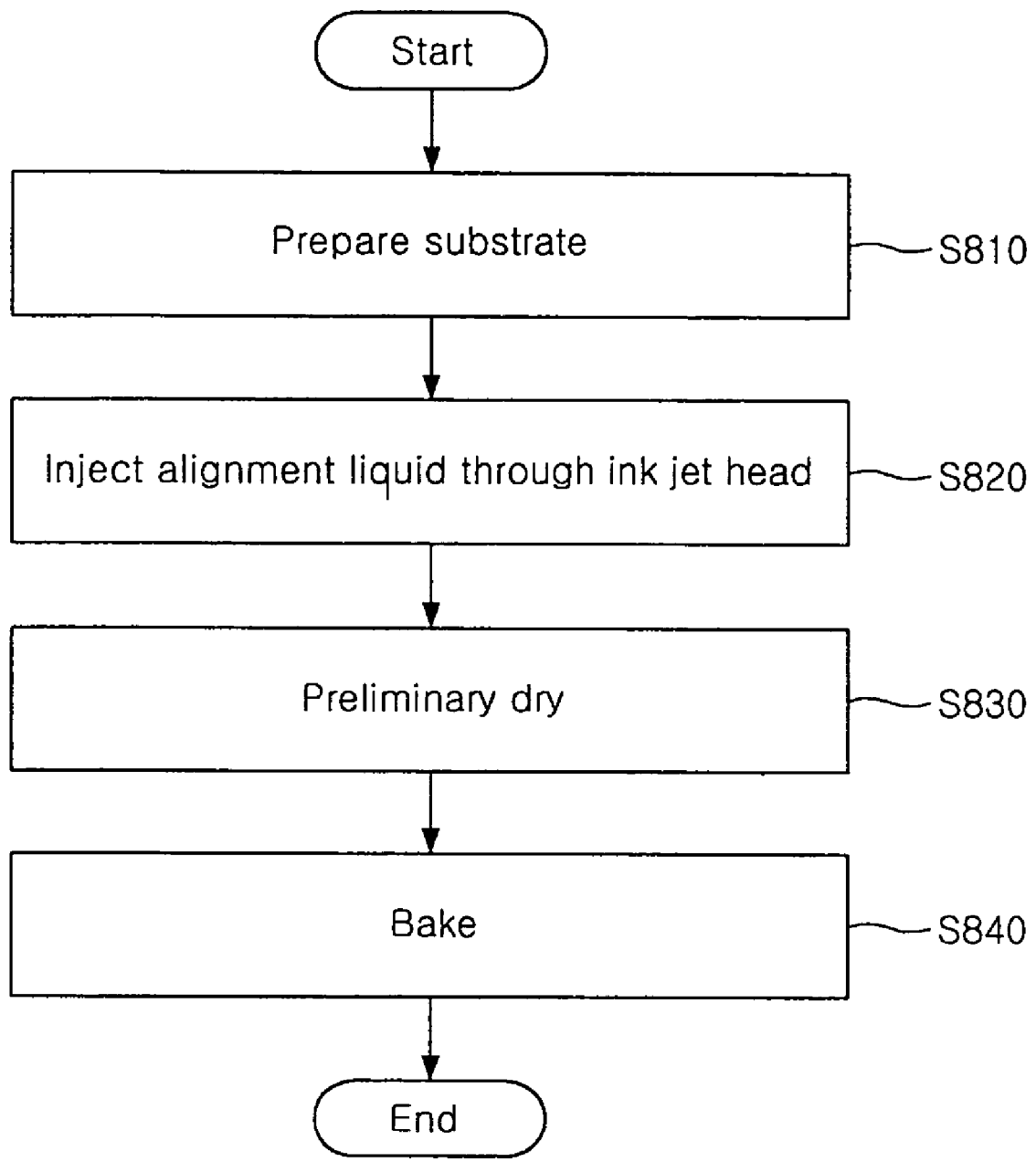

FIG. 8 is a flowchart of a method for printing an alignment layer using an alignment layer printing apparatus having an ink jet head in accordance with the present invention. Referring to FIG. 8, at step S810, an LCD substrate is first prepared to be printed with an alignment layer. The substrate may be either a TFT substrate or a color filter substrate. The TFT substrate comprises a TFT serving as a switching element for making or interrupting the application of a signal voltage to a liquid crystal cell, a pixel electrode made of a transparent, electrically conductive material, e.g., indium tin oxide (ITO), for supplying the signal voltage applied through the TFT to the liquid crystal cell, and a storage capacitor for sustaining the signal voltage applied to the pixel electrode for a selected period of time. A color filter substrate comprises a black matrix, a color filter and a common electrode.

Next, at step S820, an alignment layer ink is ejected onto the substrate while the ink jet head is moved relative to the substrate. A polyimide-based, high molecular compound is generally used as an alignment layer ink in consideration of its safety, durability and productivity properties. Further, it is preferred that the polyimide be diluted with an inorganic solvent to a mixed, low-concentration state before it is applied, so that the alignment layer ink is uniformly applied onto a large area of the substrate in the form of a relatively thin film.

Then, at step S830, the substrate with the alignment layer printed thereon is heated at a selected temperature for a selected amount of time to effect a preliminary dry. In the preliminary dry process, the solvent is evaporated from the alignment layer ink.

Finally, at step S840, the substrate is baked to stabilize the alignment layer.

As described above, in accordance with the apparatus and methods of the present invention, an alignment layer having a substantially uniform thickness can be applied to an LCD substrate, and since there is almost no variation in the thickness of the layer, the layer will exhibit virtually no longitudinal stripes.

By now, those of skill in this art will appreciate that many modifications, substitutions and variations can be made in and to the alignment layer printing materials, apparatus and methods of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. An alignment layer printing apparatus, comprising:
   an alignment layer ink ejecting unit, including an orifice unit having a plurality of orifices through which the ink is ejected, each orifice including a plurality of ink ejection passages, each passage terminating in an ink ejection hole; and,
   a plurality of control units, each controlling the flow of the alignment layer ink through a corresponding one of the orifices.

2. The apparatus of claim 1, wherein the ink ejecting unit further comprises an ink supply unit having a plurality of ink supply passages supplying the ink to the orifices.

3. The apparatus of claim 2, wherein each of the control units includes a piezoelectric element.

4. The apparatus of claim 3, further comprising a plurality of variable resistors, each adjusting a voltage applied to a corresponding one of the piezoelectric elements.

5. The apparatus of claim 3, wherein the plurality of piezoelectric elements are disposed on the ink supply unit, and the ink supply unit is disposed on the orifice unit.

6. The apparatus of claim 5, wherein the ink supply unit comprises:
   a first ink supply member having an aperture into which a corresponding one of the piezoelectric elements moves when actuated;
   a second ink supply member having an ink supply passage with a selected size; and,
   a third ink supply member having an ink supply passage with a selected size.

7. The apparatus of claim 3, wherein each of the orifices further includes a main passage communicating with the ink supply passages, and wherein the plurality of ink ejection passages branch off from the main passage.

8. The apparatus of claim 7, wherein at least some of the ink ejection passages include right-angle bends.

9. The apparatus of claim 7, wherein at least some of the ink ejection passages are inclined at an angle relative to a direction in which the alignment layer ink is ejected.

10. The apparatus of claim 3, wherein the ink ejection holes are spaced apart from one another by a distance of from between about 250 to about 375 µm.

11. The apparatus of claim 3, wherein the orifices are arranged in a plurality of rows and arranged such that the orifices of one row are staggered with respect to the orifices in an adjacent row.

12. A method for printing an alignment layer on a substrate of an LCD, the method comprising:

preparing the substrate to be printed with an alignment layer;

ejecting an alignment layer ink onto the substrate using an alignment layer printing apparatus according to claim 1;

preliminarily drying the substrate on which the alignment layer ink is ejected; and, baking the substrate.

13. The method of claim 12, wherein the alignment layer ink includes a solution mixed with polyimide.

* * * * *